United States Patent
Matsuda et al.

(10) Patent No.: US 7,787,157 B2
(45) Date of Patent: Aug. 31, 2010

(54) IMAGE READING APPARATUS, IMAGE READING METHOD AND IMAGE PROCESSING APPARATUS

(75) Inventors: Kohji Matsuda, Tokyo (JP); Tatsuo Hirono, Kanagawa (JP); Manabu Izumikawa, Saitama (JP); Yohji Mohri, Kanagawa (JP); Nobuyuki Kobayashi, Kanagawa (JP); Masami Miyajima, Kanagawa (JP); Jun Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1280 days.

(21) Appl. No.: 11/280,447

(22) Filed: Nov. 17, 2005

(65) Prior Publication Data
US 2006/0126125 A1 Jun. 15, 2006

(30) Foreign Application Priority Data
Nov. 18, 2004 (JP) ............ 2004-334563

(51) Int. Cl.
H04N 1/40 (2006.01)
H04N 1/46 (2006.01)
(52) U.S. Cl. .................. 358/461; 358/514
(58) Field of Classification Search ............ None
See application file for complete search history.

(56) References Cited

U.S. PATENT DOCUMENTS

| 4,799,081 | A |   | 1/1989  | Kikuno et al.         |
|-----------|---|---|---------|-----------------------|
| 5,091,784 | A | * | 2/1992  | Someya et al. ...... 348/589 |
| 5,146,240 | A |   | 9/1992  | Hayashi et al.        |
| 5,162,859 | A |   | 11/1992 | Hirono et al.         |
| 5,864,408 | A | * | 1/1999  | Kumashiro ....... 358/461 |
| 6,028,971 | A | * | 2/2000  | Inuiya et al. ...... 382/312 |
| 6,188,468 | B1|   | 2/2001  | Miyajima              |
| 6,388,777 | B1|   | 5/2002  | Miyajima              |
| 6,851,609 | B2|   | 2/2005  | Ando et al.           |
| 7,446,909 | B2| * | 11/2008 | Hashizume ....... 358/474 |
| 2002/0015189 | A1 |   | 2/2002  | Miyajima       |
| 2004/0170452 | A1 |   | 9/2004  | Hayashi et al. |
| 2004/0174575 | A1 | * | 9/2004  | Ide et al. ...... 358/505 |
| 2004/0233467 | A1 | * | 11/2004 | Namizuka ...... 358/1.13 |

(Continued)

FOREIGN PATENT DOCUMENTS

JP          4-275776          10/1992

(Continued)

Primary Examiner—Mark K Zimmerman
Assistant Examiner—Mesfin Getaneh
(74) Attorney, Agent, or Firm—Oblon, Spivak, McClelland, Maier & Neustadt, L.L.P.

(57) ABSTRACT

An image reading apparatus is disclosed. The image reading apparatus provides plural sensors and a correction unit that corrects displacement of image data caused by intervals among the plural sensors and includes a first draft reading mode whose scanning direction by the sensors is the same as at the time of shading correction and a second draft reading mode whose scanning direction by the sensors is different from at the time of shading correction. The correction unit includes plural paths in which a different number of delay units are disposed in each path and changing over units that change over a connection between the sensors and the paths. The changing over units are changed over between at the time of reading image data and the shading correction in the first draft reading mode and at the time of reading image data in the second draft reading mode.

8 Claims, 13 Drawing Sheets

U.S. PATENT DOCUMENTS

2004/0233479 A1* 11/2004 Hashizume ................ 358/461
2005/0141907 A1 6/2005 Izumikawa et al.
2005/0157351 A1 7/2005 Matsuda

FOREIGN PATENT DOCUMENTS

| JP | 5-14562 | 1/1993 |
|----|---------|--------|
| JP | 5-91252 | 4/1993 |
| JP | 7-23187 | 1/1995 |
| JP | 9-200449 | 7/1997 |
| JP | 2001-16442 | 1/2001 |
| JP | 2002-247292 | 8/2002 |
| JP | 2002-281325 | 9/2002 |
| JP | 2003-8849 | 1/2003 |
| JP | 2003-18367 | 1/2003 |
| JP | 2003-219116 | 7/2003 |
| JP | 2003-259085 | 9/2003 |

* cited by examiner

FIG.1 PRIOR ART
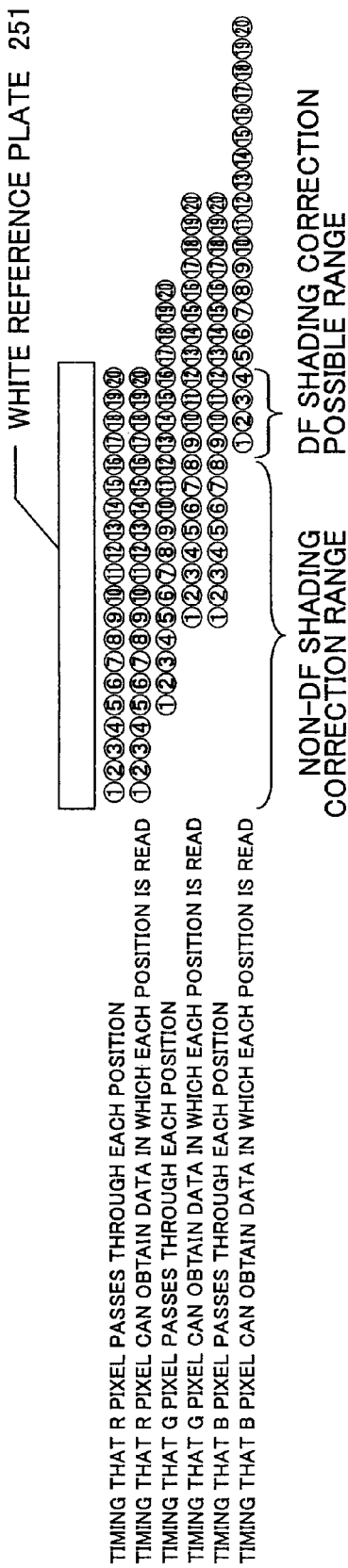
(a) CASE THAT DF SHADING CORRECTION IS EXECUTED BY DELAY SETTING IN SHEET THROUGH READING
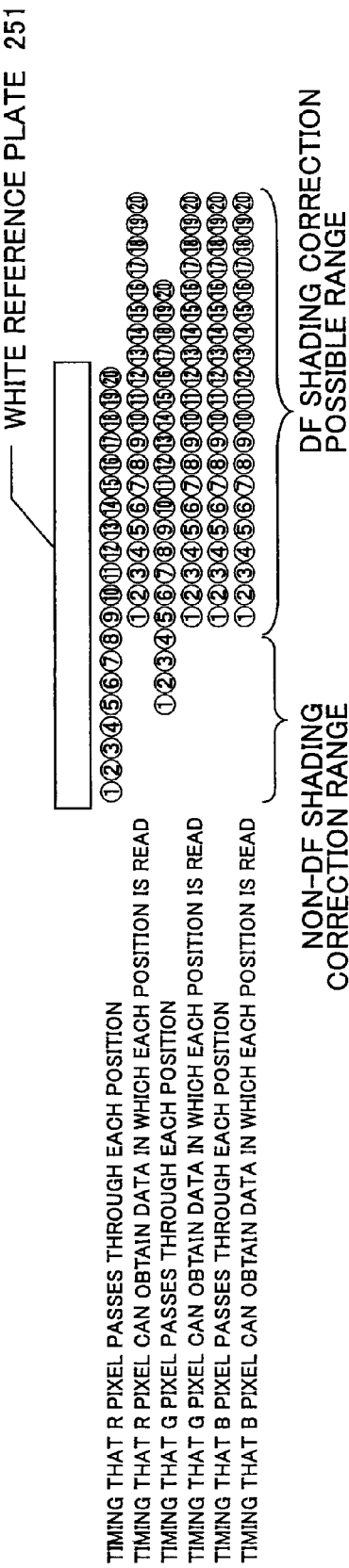
(b) CASE THAT DF SHADING CORRECTION IS EXECUTED BY DELAY SETTING IN BOOK READ READING

IMAGE READING APPARATUS, IMAGE READING METHOD AND IMAGE PROCESSING APPARATUS

BACKGROUND OF THE INVENTION

1. Field of the Invention

The present invention generally relates to an image reading apparatus, an image reading method and an image processing apparatus, in which a color image sensor composed of plural line sensors is used.

2. Description of the Related Art

Generally, in an image reading apparatus which can read a color image and an image processing apparatus such as a copying machine and a facsimile, a CCD (charge coupled device) in which line sensors executing photoelectric conversion for hues of RGB are disposed with the same interval among them is installed. For example, a CCD in which three line sensors are disposed with the same interval among them is called as a three line CCD.

When a manuscript (draft) is scanned by using the three line CCD, timing to read a specific position of the manuscript deviates by an offset in each hue. In a case where a color image is read, since there are two types of apparatuses, that is, an apparatus that can process each hue of RGB and an apparatus that can only process by considering all information of RGB after executing correction of each hue (for example, shading correction), it is necessary to correct for the delay amount by some means.

In a conventional image reading apparatus and a conventional image processing apparatus, the image processing is executed so that delay memories, such as FIFO (first-in first-out) memories for pixels of RGB are disposed and delays in each hue of RGB in a line sensor are decreased (for example, refer to Patent Document 1). Hereinafter, delay correction processing in each line is referred to as correction between lines.

In the image reading apparatus and the image processing apparatus, when scaling of an image in the sub scanning direction is executed by changing the scanning speed for the image, the delay amount in each hue is changed. Therefore, it is necessary to change the delay amount by matching the scale factor. For example, in a case where a correction amount between lines is four lines between R and G and four lines between G and B at the time when a 100% image is read, since the scanning speed becomes doubled at the time when the 50% image is read, the delay amount between hues becomes two lines between R and G and two lines between G and B.

In addition, in the image reading apparatus and the image processing apparatus, there are two types, that is, a book read type that reads a manuscript by scanning the manuscript put on a contact glass with the use of an exposing scanning unit, and a sheet through type that reads the manuscript by moving the manuscript without moving the exposing scanning unit. In the image reading apparatus and the image processing apparatus that can realize both the types, since the scanning direction for the manuscript is generally reversed between the types, the relation of the correction between lines in RGB is reversed.

For example, in a case of a condition that G is delayed by four lines for R and B is delayed by eight lines for R in reading by the book read type (hereinafter, referred to as a book read reading), G is delayed by four lines for B and R is delayed by eight lines for B in reading by the sheet through type (hereinafter, referred to as a sheet through reading).

[Patent Document 1] Japanese Laid-Open Patent Application No. 2001-16442

In a case of executing the sheet through reading, the exposing scanning unit (hereinafter, referred to as a carriage) is first moved in the white reference plate direction while the manuscript is moved, correction called shading correction that reduces dispersion in the main scanning direction is executed by reading the white reference plate. In the image reading apparatus and the image processing apparatus, after the white reference plate is read, the carriage is moved to the reading position, and the manuscript is read by moving the manuscript. In the following explanations, this operation is called DF shading correction.

However, in a case of the sheet through reading, since the relation among RGB is reversed from the book read reading, when the DF shading correction is executed in a setting of the correction between lines for the sheet through reading, the correction between lines is reversed, as a result, as shown in FIG. 1, the effective range of the white reference plate is narrowed. FIG. 1 is a conceptual diagram explaining a reason why the effective range of the white reference plate is narrowed.

FIG. 1(a) shows a case in which the DF shading correction is executed in a setting of the correction between lines for the sheet through reading. FIG. 1(b) shows a case in which the DF shading correction is executed in a setting of the correction between lines for the book read reading. A number surrounded by a circle shows each position on a white reference plate 251. The position in the horizontal direction of the number surrounded by the circle shows timing when each pixel of R, G, and B passes through a position.

In this case, since the interval among R, G, and B is four lines, when a pixel of R reads the ninth line, a pixel of B starts to read the white reference plate 251. Further, since data of G are delayed by four lines and data of B are delayed by eight lines for data of R as the correction between lines, timing, when the pixel of B can obtain data that read each position, is delayed by twice the pixel interval. For example, in the case of FIG. 1(a), it is the time when the pixel of R reads the seventeenth line that the DF shading correction is started, and the effective range of the white reference plate 251 is narrowed (DF shading correction possible range in FIG. 1(a)), compared with the case shown in FIG. 1(b). As a result, extra time is required for the DF shading correction.

The extra time consuming for the DF shading correction prevents the reading speed from being high. Shortening the extra time for the DF shading correction is important to realize high speed reading.

In the Patent Document 1, it is described that the setting of the amount of the correction between lines is changed by considering the scaling. However, a problem caused by reading direction difference in the DF shading correction at the time of the sheet through reading is not solved.

SUMMARY OF THE INVENTION

In a preferred embodiment of the present invention, there is provided an image reading apparatus, an image reading method and an image processing apparatus in which an effective range of a white reference plate in shading correction can be efficiently obtained.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an image reading apparatus, an image reading method and an image processing apparatus particularly pointed out in the specification in such full, clear, concise, and exact terms as to enable a person having ordinary skill in the art to practice the invention.

To achieve these and other advantages in accordance with the purpose of the present invention, according to one aspect of the present invention, there is provided an image reading apparatus which provides a plurality of sensors that execute photoelectric conversion of a plurality of hues and a correction unit that corrects displacement of image data caused by intervals among the plural sensors and includes a first draft reading mode whose scanning direction by the sensors is the same as at the time of shading correction and a second draft reading mode whose scanning direction by the sensors is different from at the time of shading correction. The correction unit comprises a plurality of paths in which paths a different number of delay units are disposed in each path and changing over units that change over a connection between the sensors and the paths, and the changing over units are changed over between at the time of reading image data and the shading correction in the first draft reading mode and at the time of reading image data in the second draft reading mode.

According to another aspect of the present invention, there is provided an image reading method in an image reading apparatus which provides a plurality of sensors that execute photoelectric conversion of a plurality of hues, and a correction unit that corrects displacement of image data caused by intervals among the plural sensors and includes a first draft reading mode whose scanning direction by the sensors is the same as at the time of shading correction and a second draft reading mode whose scanning direction by the sensors is different from at the time of shading correction. The correction unit comprises a plurality of paths in which paths a different number of delay units are disposed in each path and changing over units that change over a connection between the sensors and the paths. The method includes the steps of executing the shading correction by changing over the changing over units in the same as at the time of the reading image data in the first draft reading mode, and executing the reading image data in the second draft reading mode by changing over the changing over units from at the time of the shading correction.

According to another aspect of the present invention, there is provided an image processing apparatus including an image reading apparatus which provides a plurality of sensors that execute photoelectric conversion of a plurality of hues and a correction unit that corrects displacement of image data caused by intervals among the plural sensors and includes a first draft reading mode whose scanning direction by the sensors is the same as at the time of shading correction and a second draft reading mode whose scanning direction by the sensors is different from at the time of shading correction. The correction unit comprises a plurality of paths in which paths a different number of delay units are disposed in each path and changing over units that change over a connection between the sensors and the paths, and the correction unit changes over the changing over units between at the time of the reading image data and the shading correction in the first draft reading mode and at the time of the reading image data in the second draft reading mode.

According to another aspect of the present invention, a problem caused by the scanning directions by the sensors between at the time of shading correction and at the second draft reading mode being different is solved by the changing over units being changed over between at the time of reading the image data and the shading correction in the first draft reading mode and at the time of reading the image data in the second draft reading.

That is, in the first draft reading mode in which the scanning direct by the sensors is the same as at the time of the shading correction, the connections between the sensors and the paths are not changed over. On the other hand, in the second draft reading mode in which the scanning direction by the sensors is different from at the time of the shading correction, the connections between the sensors and the paths are different from at the time of reading the image data and the shading correction in the first draft reading mode.

The changing over by the changing over unit is determined by the relation between the disposition of the plural sensors and the scanning direction. By the relation between the disposition of the plural sensors and the scanning direction, the connections between the sensors and the paths are changed over so that image data of a hue whose reading is started first are delayed more and image data of a hue whose reading is started later are delayed less. Further, image data of a hue whose reading is started last are passed through a path where the delay units are not disposed (the number of the delay units is 0).

EFFECT OF THE INVENTION

According to embodiments of the present invention, an image reading apparatus, an image reading method and an image processing apparatus, in which an effective range of a white reference plate in shading correction can be efficiently obtained, are provided.

BRIEF DESCRIPTION OF THE DRAWINGS

Other objects, features and advantages of the present invention will become more apparent from the following detailed description when read in conjunction with the accompanying drawings, in which:

FIG. 1 is a conceptual diagram explaining a reason why an effective range of a white reference plate is narrowed;

DESCRIPTION OF THE PREFERRED EMBODIMENTS

Best Mode of Carrying Out the Invention

In the following, a best mode of carrying out the present invention is described with reference to the accompanying drawings.

Figure 2:
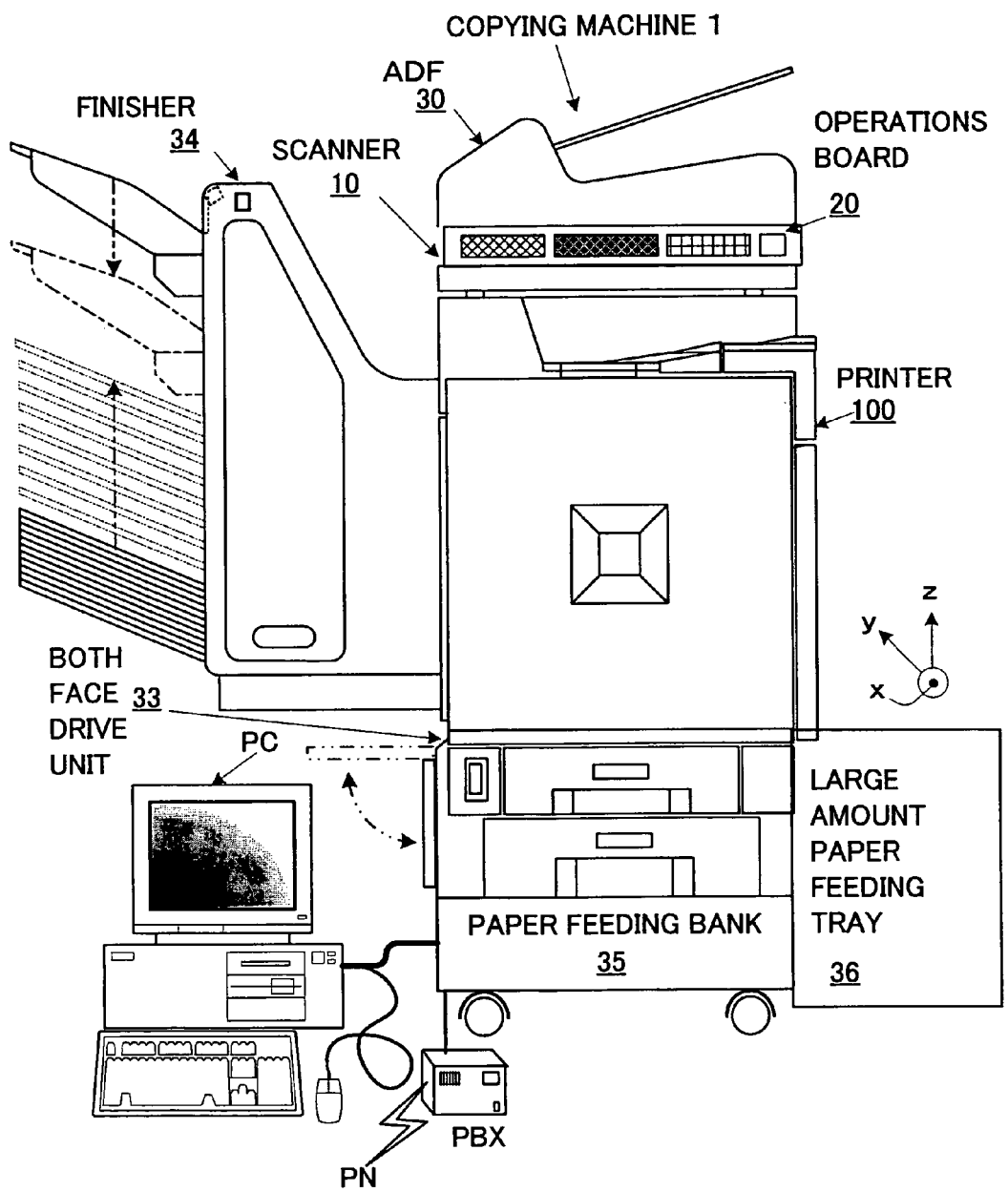
FIG. 2 is a diagram showing the appearance of a copying machine according to embodiments of the present invention.

FIG. 2 is a diagram showing the appearance of a copying machine according to embodiments of the present invention. In FIG. 2, a copying machine 1 includes a scanner 10, an operations board 20, an ADF (automatic draft feeder) 30, a both face drive unit 33, a finisher 34, a paper feeding bank 35, a large amount paper feeding tray 36, and a printer 100. The copying machine 1 can include an I/F (interface) for connecting to a PC (personal computer) or a predetermined network. In addition, the copying machine 1 can include an I/F for connecting to a PN (public network) via/not via a PBX (private branch exchange).

Figure 3:
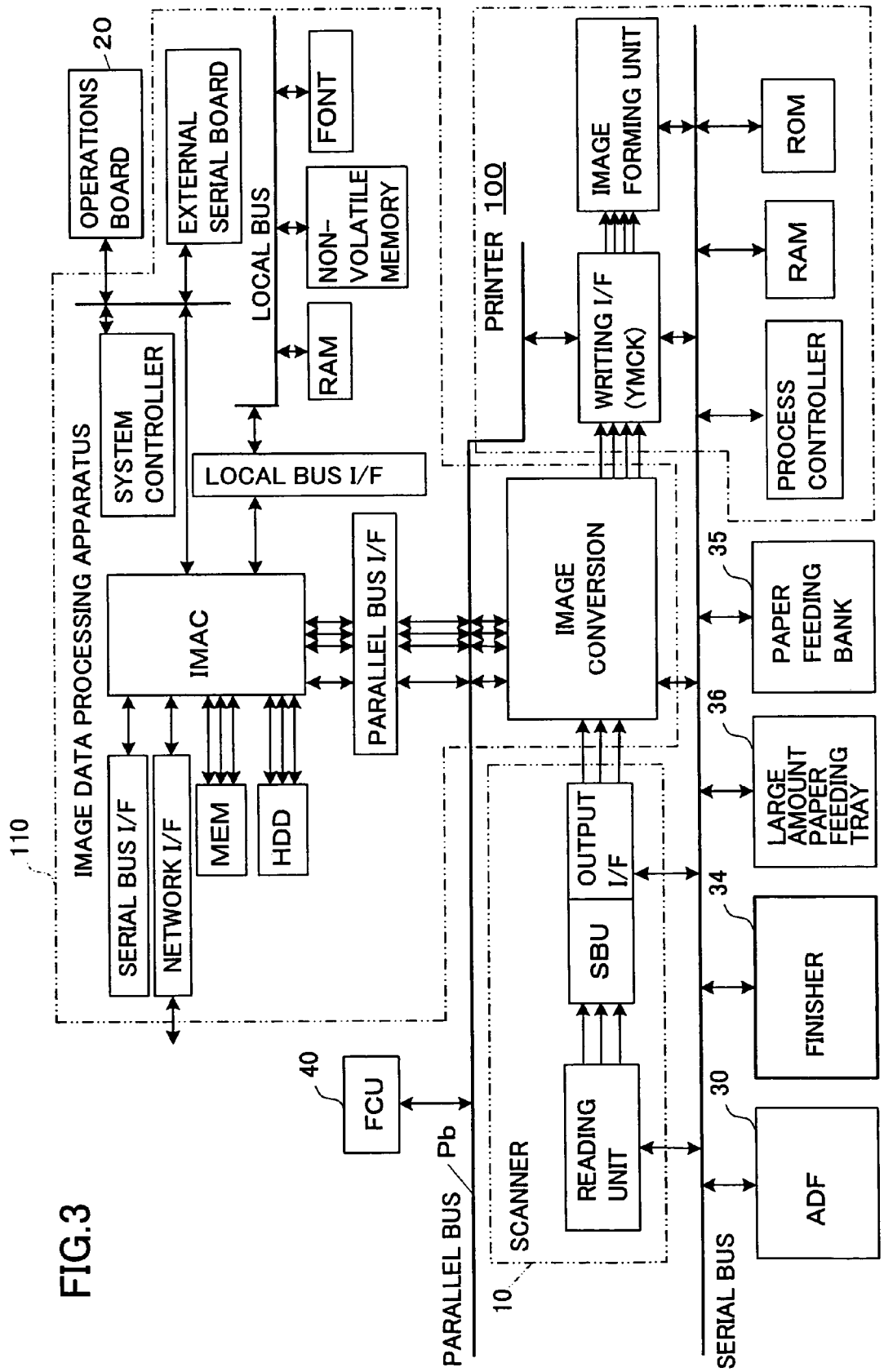
FIG. 3 is a diagram showing a system structure of the copying machine.

FIG. 3 is a diagram showing a system structure of the copying machine 1. As shown in FIG. 3, in the copying machine 1, an image data processing apparatus 110 is connected to the scanner 10, the operations board 20, the ADF 30, the finisher 34, the paper feeding bank 35, the large amount paper feeding tray 36, a FCU (facsimile control unit) 40, and the printer 100.

When the copying machine 1 receives an instruction to read image data from the operations board 20, a system controller of the image data processing apparatus 110 instructs an image reading apparatus configured to include the scanner 10 and the ADF 30 to execute reading preparations, such a calculation and a register setting for executing reading operations. At the same time, the system controller of the image data processing apparatus 110 instructs storage devices, such as a MEM (memory), and a HDD (hard disk drive) to prepare for storing read image data.

When the system controller of the image data processing apparatus 110 receives notifications of reading preparation completion and storing preparation completion, the system controller requests the image reading apparatus to start reading the image data. The image reading apparatus reads the image data upon receipt of the reading start request and transfers read image data to the storage device, such as the MEM and the HDD. After transferring the image data, if necessary, the system controller requests an image output device, such as the printer 100, to output the image data. The image output device outputs the image data stored in the storage device to a medium upon receipt of the output request from the controller.

Since the appearance of the copying machine 1 shown in FIG. 2 and the system structure shown in FIG. 3 are publicly known, their detailed explanations are omitted. Next, referring to FIGS. 4 through 7, operations of an image reading apparatus according to embodiments of the present invention are explained.

Figure 4:
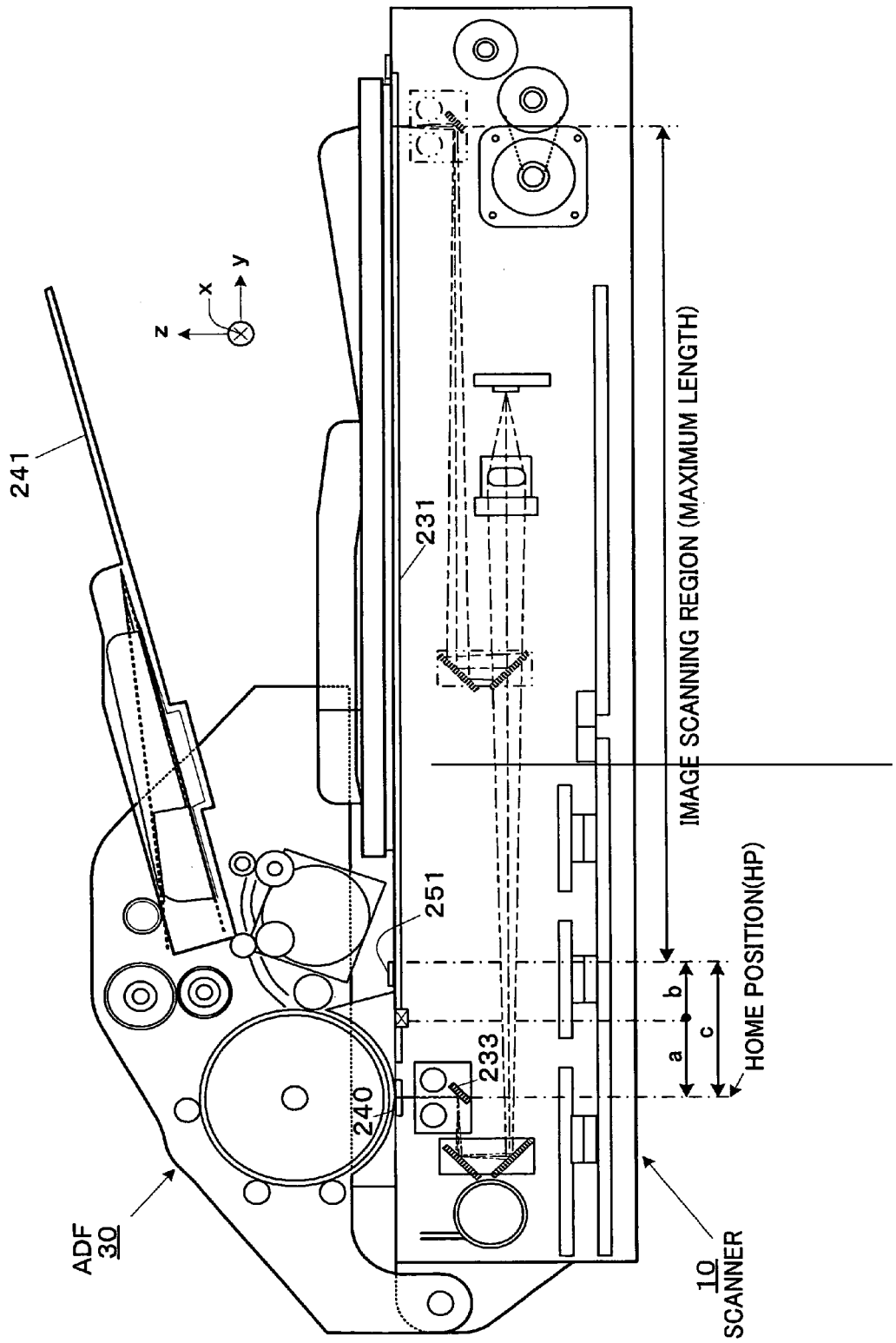
FIG. 4 is a schematic diagram showing an image reading apparatus according to the embodiments of the present invention.

FIG. 4 is a schematic diagram showing the image reading apparatus according to the embodiments of the present invention. The image reading apparatus shown in FIG. 4 is configured to include the scanner 10 and the ADF 30. The image reading apparatus can read image data by a sheet through mode and a book read mode.

In reading image data by the sheet through mode, a carriage 233 is fixed under a contact glass 240 for the sheet through mode, a draft put on a draft tray 241 is passed on the contact glass 240, and image data of the draft are read. In reading image data by the book read mode, a draft is read by moving the carriage 233 at a low speed under the stationary draft on a contact glass 231.

In the book read mode, when the carriage 233 reaches a white reference plate 251 in the middle of moving under the contact glass 231, the white reference plate 251 is read and shading correction is executed. At this time, since the scanning direction and the speed of the draft match the scanning direction and the speed of the white reference plate 251 at the time of reading (all in the y direction), the setting of the correction between lines is not changed before and after the shading correction.

In the sheet through mode, before passing the draft, the carriage 233 is first moved to the white reference plate 251, and the carriage 233 reads the white reference plate 251 by scanning; with this, the shading correction is executed. After this, the carriage 233 is returned to the sheet through reading position (home position) under the contact glass 240 for the sheet through mode. Reading the draft is executed by passing the draft above the carriage 233 with scanning.

At this time, the operations of reading the white reference plate 251 in the DF shading correction and scanning the draft by the sheet through reading are executed individually. The sheet through reading changes the scanning speed by a variable magnification. On the other hand, the scanning speed of the white reference plate 251 in the DF shading correction is constant instead of a variable.

Figure 5:
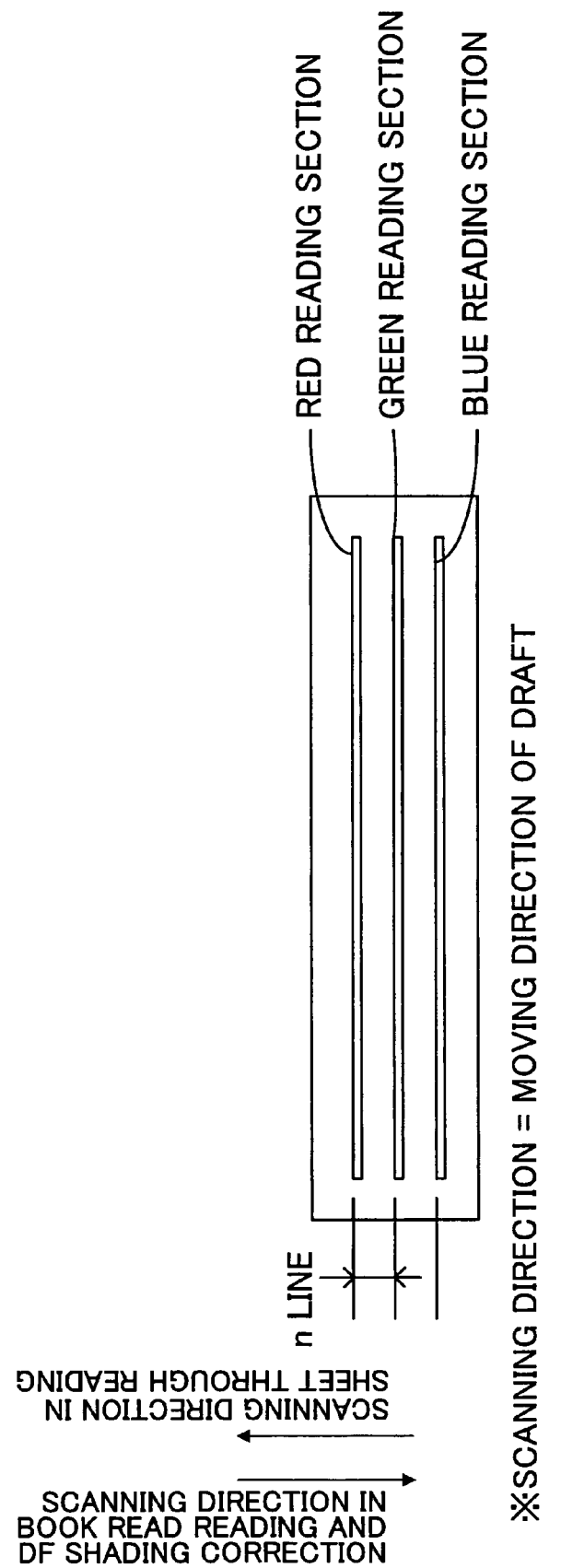
FIG. 5 is a schematic diagram showing a three line CCD.

In the carriage 233, as an example of a photoelectric conversion element for image data reading, a CCD in which line sensors are arrayed with the same interval is installed. FIG. 5 is a schematic diagram showing a three line CCD. The three line CCD shown in FIG. 5 is composed of a red reading section, a green reading section, and a blue reading section. As shown in FIG. 5, the relative scanning direction of the white reference plate 251 to the carriage 233 is reverse to the scanning direction of the draft by the sheet through reading. The relative scanning direction of the white reference plate 251 to the carriage 233 is equal to the scanning direction of the draft by the book read reading. Therefore, the amount of the correction between lines to be set is different between at the time of the DF shading correction and at the time of the sheet through reading.

Figure 6:
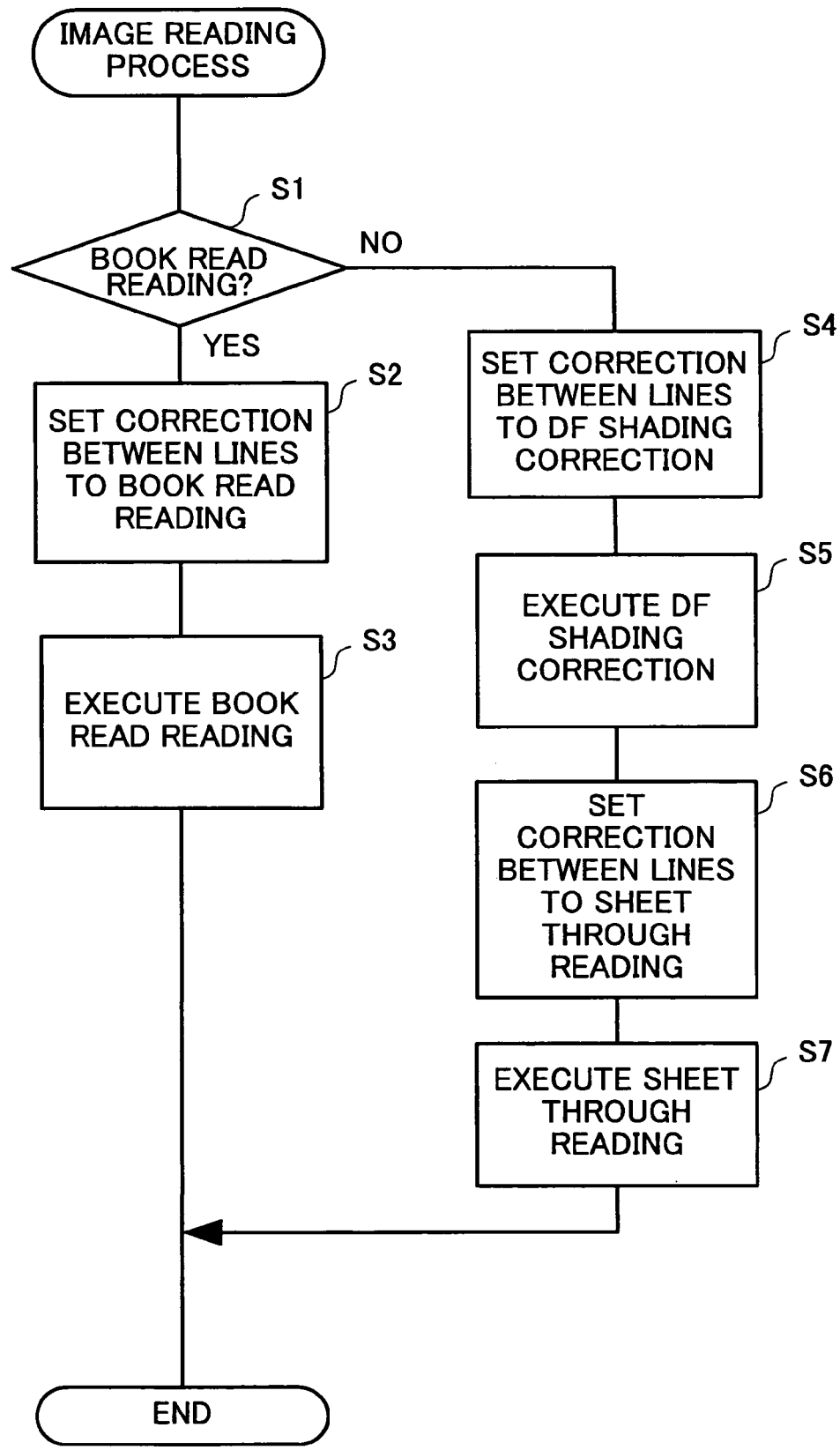
FIG. 6 is a flowchart showing a first operation for controlling a setting of correction between lines.

FIG. 6 is a flowchart showing a first operation for controlling a setting of the correction between lines. First, it is determined whether the image reading apparatus executes book read reading (step S1). When the image reading apparatus executes the book read reading (Yes at step S1), the image reading apparatus goes to step S2 and sets the correction between lines to the book read reading. After this, the image reading apparatus executes the book read reading (step S3) and ends the operation.

On the other hand, when the image reading apparatus does not execute the book read reading (No at step S1), the image reading apparatus goes to step S4 and sets the correction between lines to DF shading correction. After this, the image reading apparatus executes the DF shading correction (step S5). The image reading apparatus goes to step S6 and sets the correction between lines to sheet through reading. Then, the image reading apparatus executes the sheet through reading (step S7) and ends the operation.

According to the flowchart shown in FIG. 6, before executing the DF shading correction, the correction between lines is set to the DF shading correction, and after reading the white reference plate 251 by scanning, the correction between lines is changed to the sheet through reading.

By the operation mentioned above, in each pixel of RGB even at the time of the DF shading correction, as shown in FIG. 1 (b), when a pixel of R reads the ninth line, all image data at the same position with the white reference plate 251 can be read. Therefore, the effective range of the white reference plate 251 (DF shading correction possible range in FIG. 1(b)) can be widened, compared with the case shown in FIG. 1(a).

First Embodiment

Figure 7:
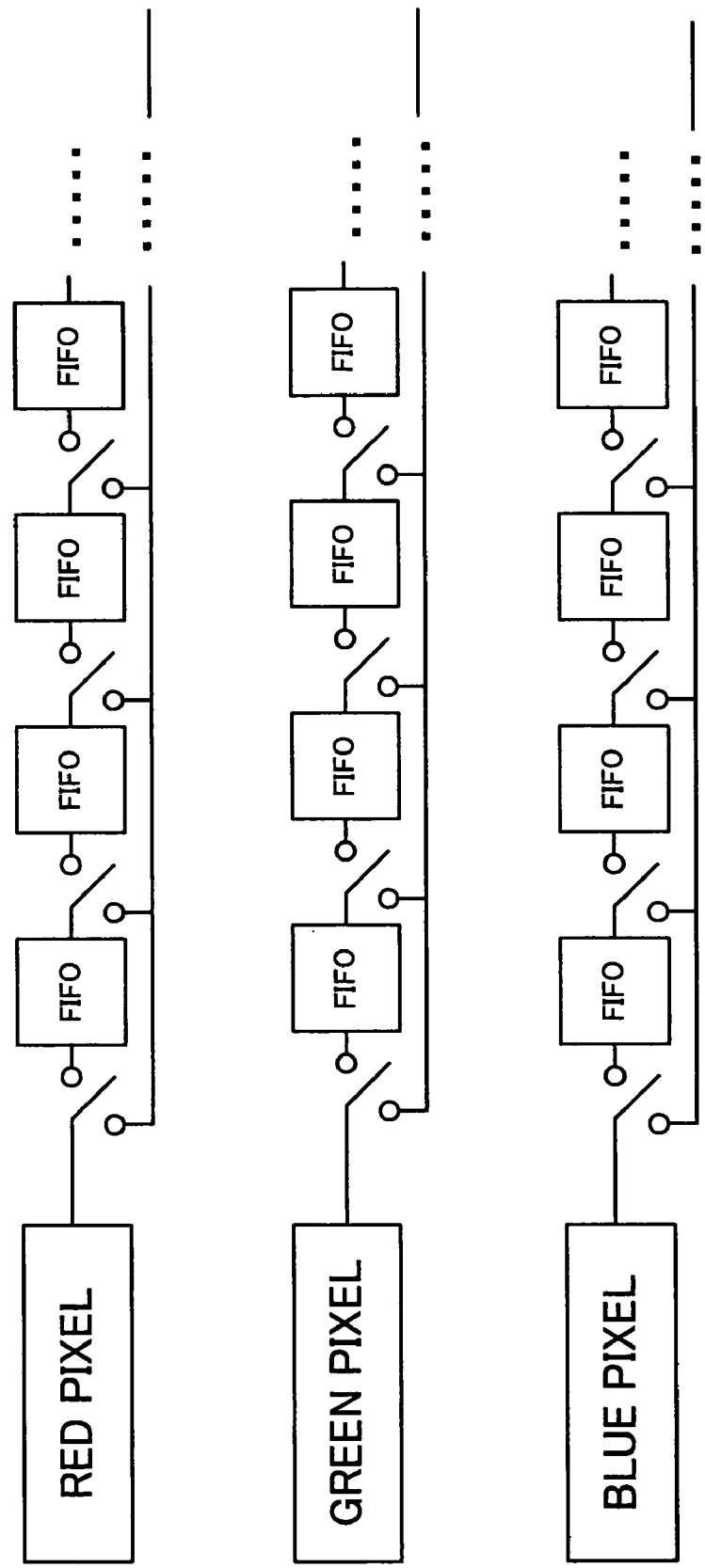
FIG. 7 is a diagram showing a first structure of a block which sets an amount of the correction between lines.

FIG. 7 is a diagram showing a first structure of a block which sets the amount of the correction between lines. The block which sets the amount of the correction between lines has a structure that has plural paths in which plural delay memories, such as FIFO memories, are disposed for pixels of R, G, and B read from the red reading section, the green reading section, and the blue reading section shown in FIG. 5, and the amount of the correction between lines can be set by plural switches.

However, the block that sets the amount of the correction between lines shown in FIG. 7 disposes the plural delay memories, such as the FIFO memories for the pixels of R, G, and B. Consequently, the cost increases. Therefore, in a case of a three line CCD, as in examples shown in FIGS. 8 and 9, the block has a structure in which plural delay memories are disposed for pixels of R and G, and delay memories are not disposed for pixels of B.

Figure 8:
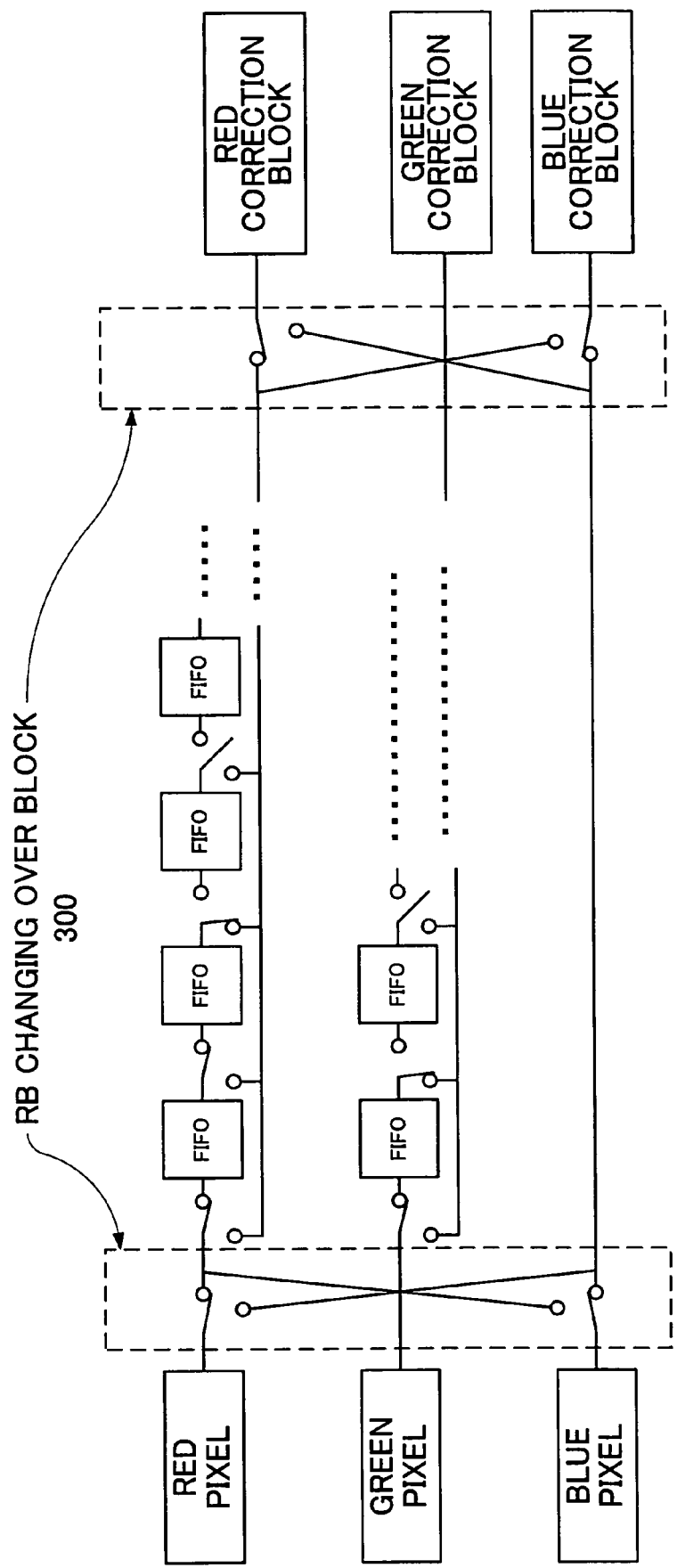
FIG. 8 is a diagram showing another block which sets the amount of the correction between lines.
Figure 9:
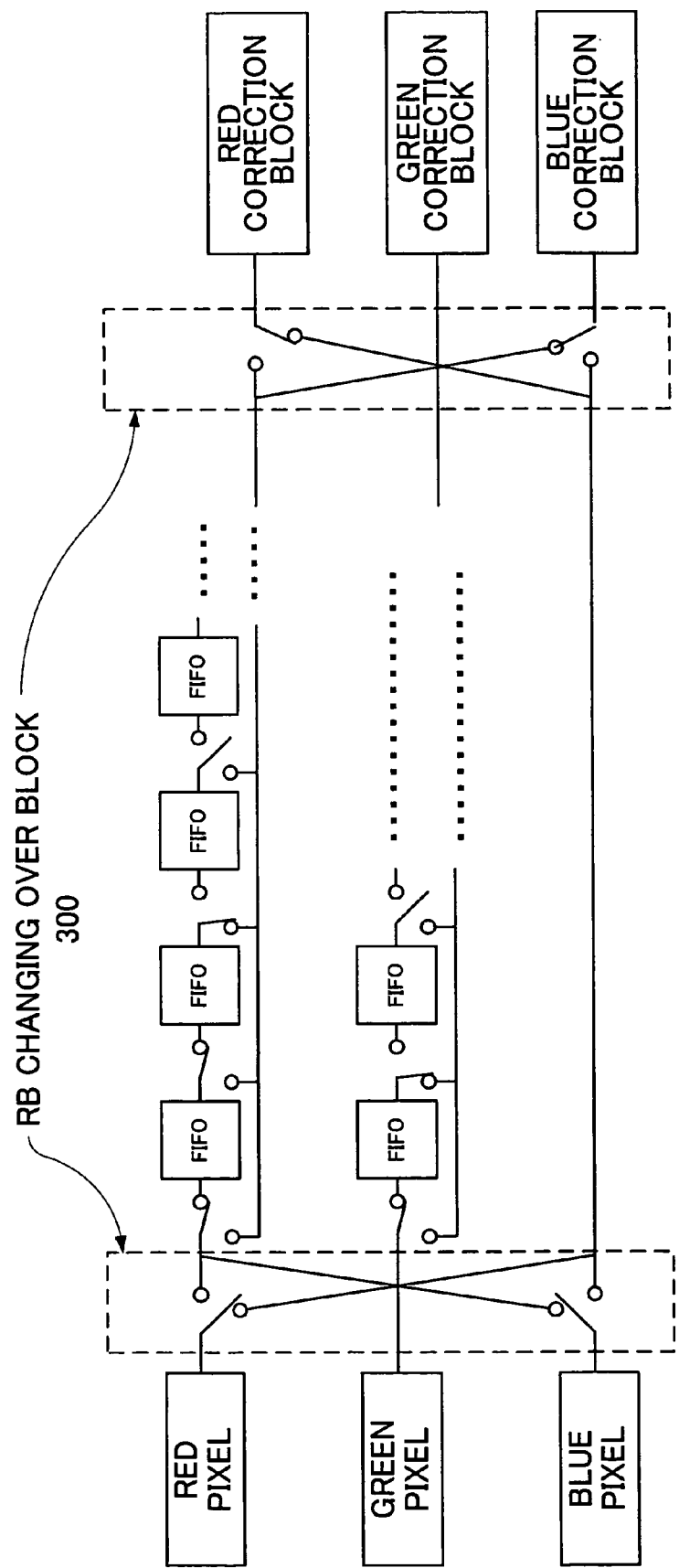
FIG. 9 is a diagram showing yet another block which sets the amount of the correction between lines.

FIGS. 8 and 9 are diagrams showing another block which sets the amount of the correction between lines. The blocks which set the amount of the correction between lines shown in FIGS. 8 and 9 newly provide RB changing over block sections 300 that change over the paths for pixels of R and B.

At the time of the book read reading and the DF shading correction, as shown in FIG. 8, the correction between lines is executed without changing over the path for the pixels of R and B, and the displacement of reading positions is corrected. At the time of the sheet through reading, as shown in FIG. 9, the correction between lines is executed by changing over the path for the pixels of R and B, and the displacement of reading positions is corrected. After this, as shown in FIG. 8, the path for the pixels of R and B is returned to the original position by again changing over the path.

Figure 10:
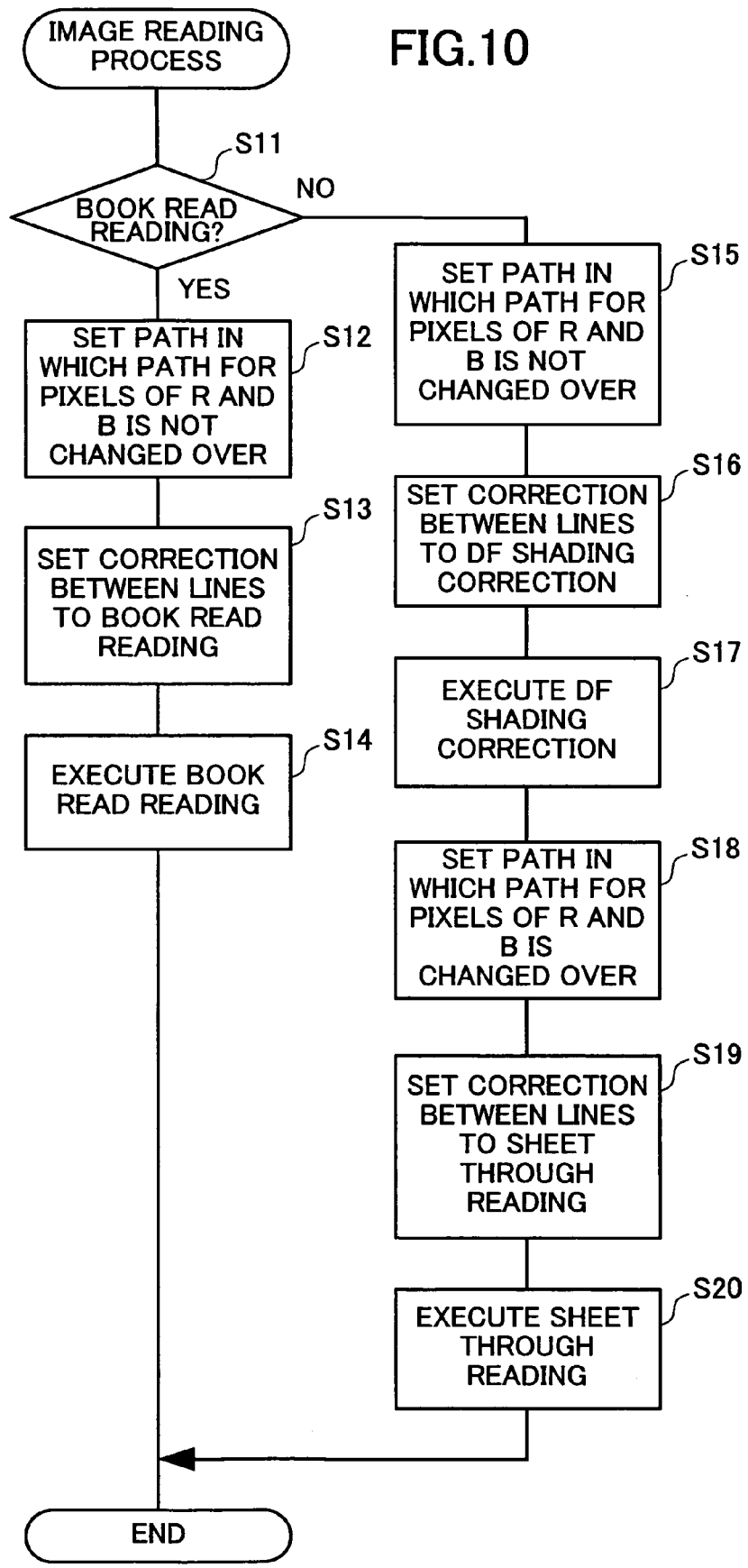
FIG. 10 is a flowchart showing a second operation for controlling a setting of the correction between lines.

FIG. 10 is a flowchart showing a second operation for controlling a setting of the correction between lines. First, it is determined whether the image reading apparatus executes book read reading (step S11). When the image reading apparatus executes the book read reading (Yes at step S11), the image reading apparatus goes to step S12 and sets a path in which the path for pixels of R and B is not changed over. In this, whether the path for pixels of R and B is changed over is set by the RB changing over blocks 300.

The image reading apparatus goes to step S13 and sets the correction between lines to book read reading. After this, the image reading apparatus executes the book read reading (step S14) and ends the operation.

On the other hand, when the image reading apparatus does not execute the book read reading (No at step S11), the image reading apparatus goes to step S15 and sets a path in which the path for pixels of R and B is not changed over. The image reading apparatus goes to step S16 and sets the correction between lines to DF shading correction. After this, the image reading apparatus executes the DF shading correction (step S17).

The image reading apparatus goes to step S18 and sets a path in which the path for pixels of R and B is changed over. The image reading apparatus goes to step S19 and sets the correction between lines to sheet through reading. Then, the image reading apparatus executes the sheet through reading (step S20) and ends the operation.

According to the flowchart shown in FIG. 10, before executing the DF shading correction, the path for pixels of R and B is set not to be changed over, and the amount of the correction between lines, which matches the scanning speed of the white reference plate 251 in the DF shading correction, is set. After reading the white reference plate 251 by scanning, it is set that the path for pixels of R and B is changed over, the amount of the correction between lines is set to an amount matching the variable magnification of reading and the sheet through reading is executed.

By the operation mentioned above, at the time of the sheet through reading, in the image reading apparatus that changes over the path for pixels of R and B, the effective range of the white reference plate 251 (DF shading correction possible range in FIG. 1(b)) can be widened, compared with the case shown in FIG. 1(a).

Second Embodiment

In the above blocks setting the amount of the correction between lines shown in FIGS. 8 and 9, it is ideal that the process in each hue be executed before the front RB changing over block 300 and behind the back RB changing over block 300. However, depending on the structure of the image reading apparatus, some image reading apparatuses execute a part of the process before the back RB changing over block 300.

Figure 11:
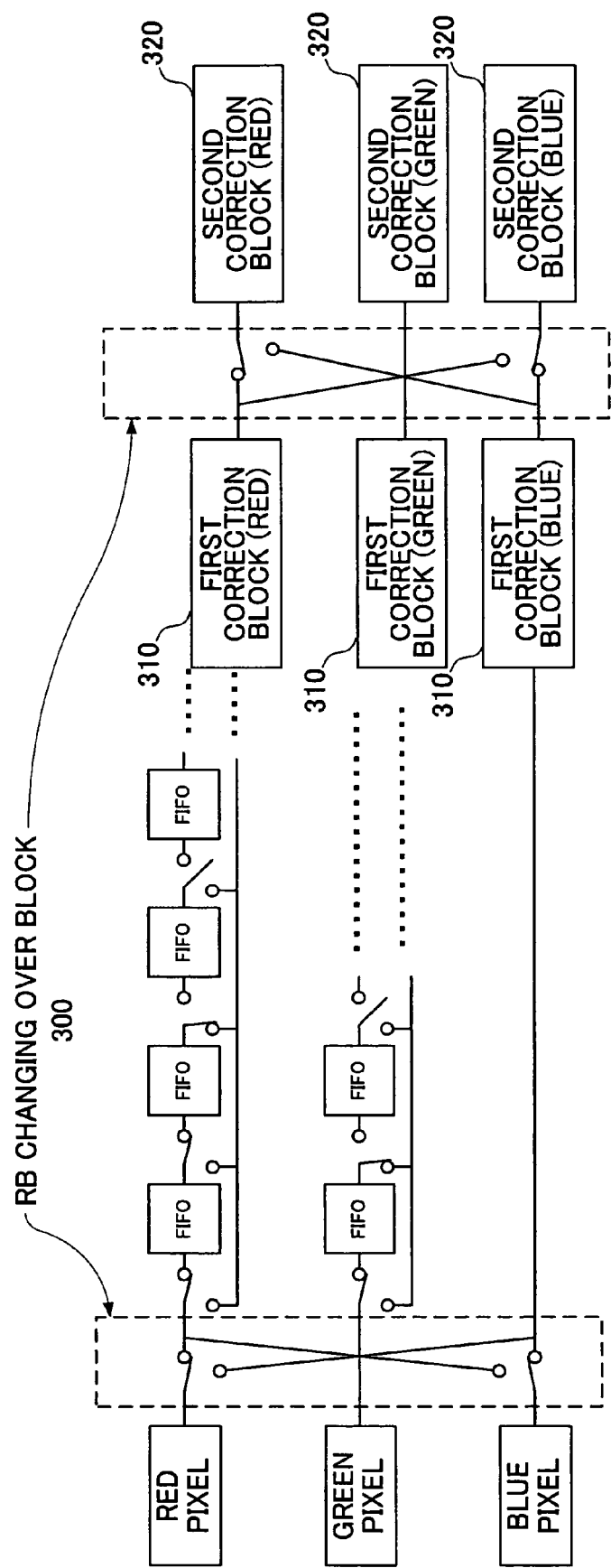
FIG. 11 is a diagram showing a second structure of a block which sets the amount of the correction between lines.

FIG. 11 is a diagram showing a second structure of a block which sets the amount of the correction between lines. The block which sets the amount of the correction between lines shown in FIG. 11 includes the RB changing over blocks 300 which change over the path for pixels of R and B. Further, the block which sets the amount of the correction between lines shown in FIG. 11 additionally includes first correction blocks 310 and second correction blocks 320 each for hues of R, G, and B before and after the back RB changing over block 300.

For example, the first correction blocks 310 execute the shading correction, and the second correction blocks 320 execute dot correction (decimal point part correction in the correction between lines). In this, the structure including the first and second correction blocks 310 and 320 utilize circuits using in a conventional apparatus in common. Therefore, the process by the second correction blocks 320 can be executed by the first correction blocks 310 by omitting the second correction blocks 320.

At the time of the book read reading and the DF shading correction, the correction between lines is executed without changing over the path for pixels of R and B, and the displacement of reading positions is corrected. At the time of the sheet through reading, the correction between lines is executed by changing over the path for pixels of R and B, and the displacement of reading positions is corrected. After this, the path for pixels of R and B is returned to the original position by again changing over the path.

Figure 12:
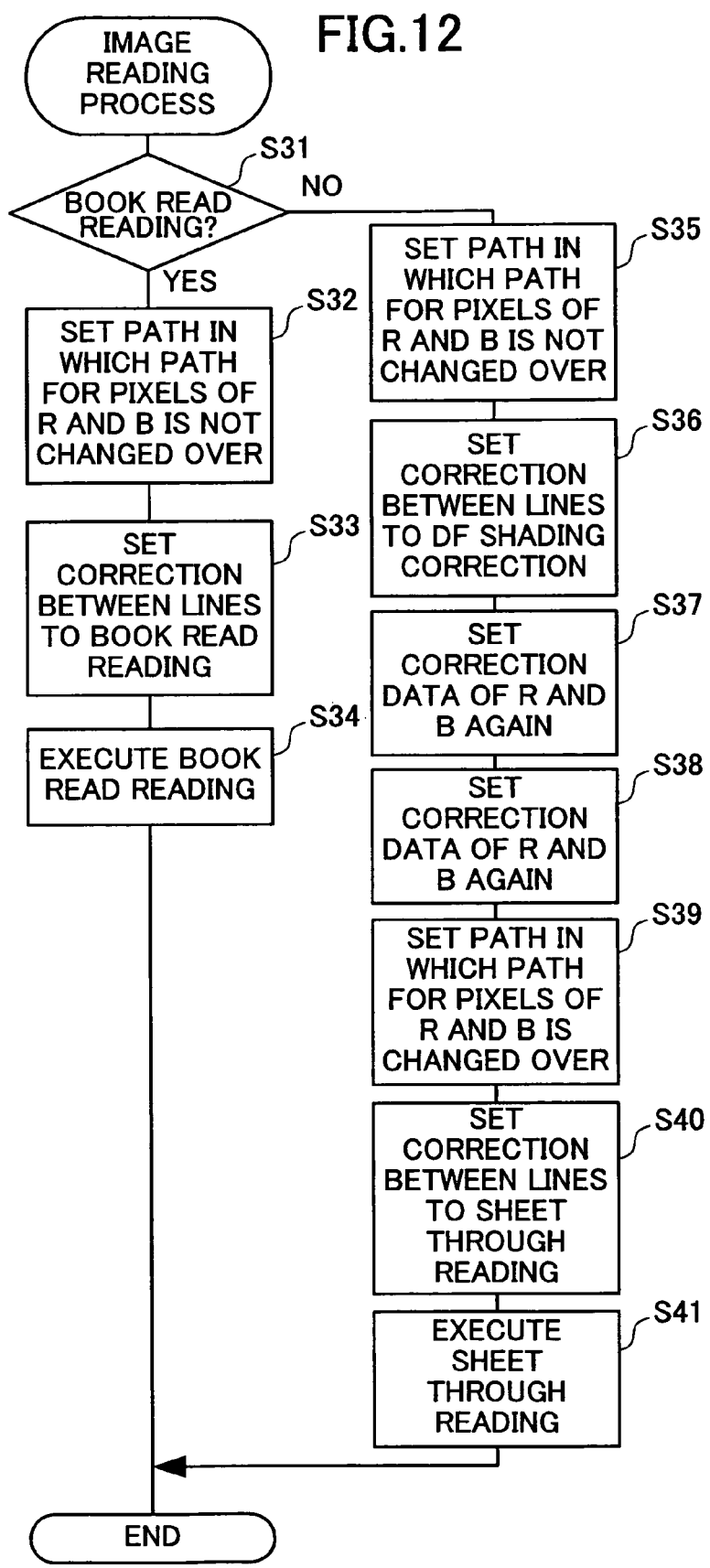
FIG. 12 is a flowchart showing a third operation for controlling a setting of correction between lines.

FIG. 12 is a flowchart showing a third operation for controlling a setting of correction between lines. First, it is determined whether the image reading apparatus executes book read reading (step S31). When the image reading apparatus executes the book read reading (Yes at step S31), the image reading apparatus executes steps S32 through S34, as in the steps 12 through 14 shown in FIG. 10.

On the other hand, when the image reading apparatus does not execute the book read reading (No at step S31), the image reading apparatus executes steps S35 through S37 as in the steps 15 through 17 shown in FIG. 10. After this, the image reading apparatus goes to step S38 and executes the following operation. In the block setting the amount of the correction between lines shown in FIG. 11, even when the path for pixels of R and B is changed over after executing the DF shading correction, the obtained correction data are reversed in R and B.

Therefore, the image reading apparatus goes to step S38, and correction data of R and B in the first and second correction blocks 310 and 320 are set again from a CPU. Then, the image reading apparatus executes steps S39 through S41 as in the steps 18 through 20 shown in FIG. 10.

According to the flowchart shown in FIG. 12, even if the obtained correction data are reversed in R and B, the correction data can be set again. With this, at the time of the sheet through reading, even when the first correction blocks 310 exist between the RB changing over blocks 300 which change over the path for pixels of R and B, the effective range of the white reference plate 251 (DF shading correction possible range in FIG. 1(b)) can be widened, compared with the case shown in FIG. 1(a).

Third Embodiment

In the blocks setting the amount of the correction between lines shown in FIG. 11, an example that does not need to set again the correction data of each hue form the CPU is explained. Generally, correction processes, such as a shading correction process, burden the CPU with complex calculations and feedback processes; therefore, a process device called as an ASIC (application specific integrated circuit) being an external device from the CPU is generally used for the correction processes. In this case, the correction data are rewritten from the ASIC.

When the correction data are set again from the CPU, an input stage to a register is required and this causes a cost increase. As a result, there is a case where the register of the ASIC cannot be written to by not being able to rewrite the correction data from the CPU. In this case, the image reading apparatus executes a process shown in FIG. 13.

Figure 13:
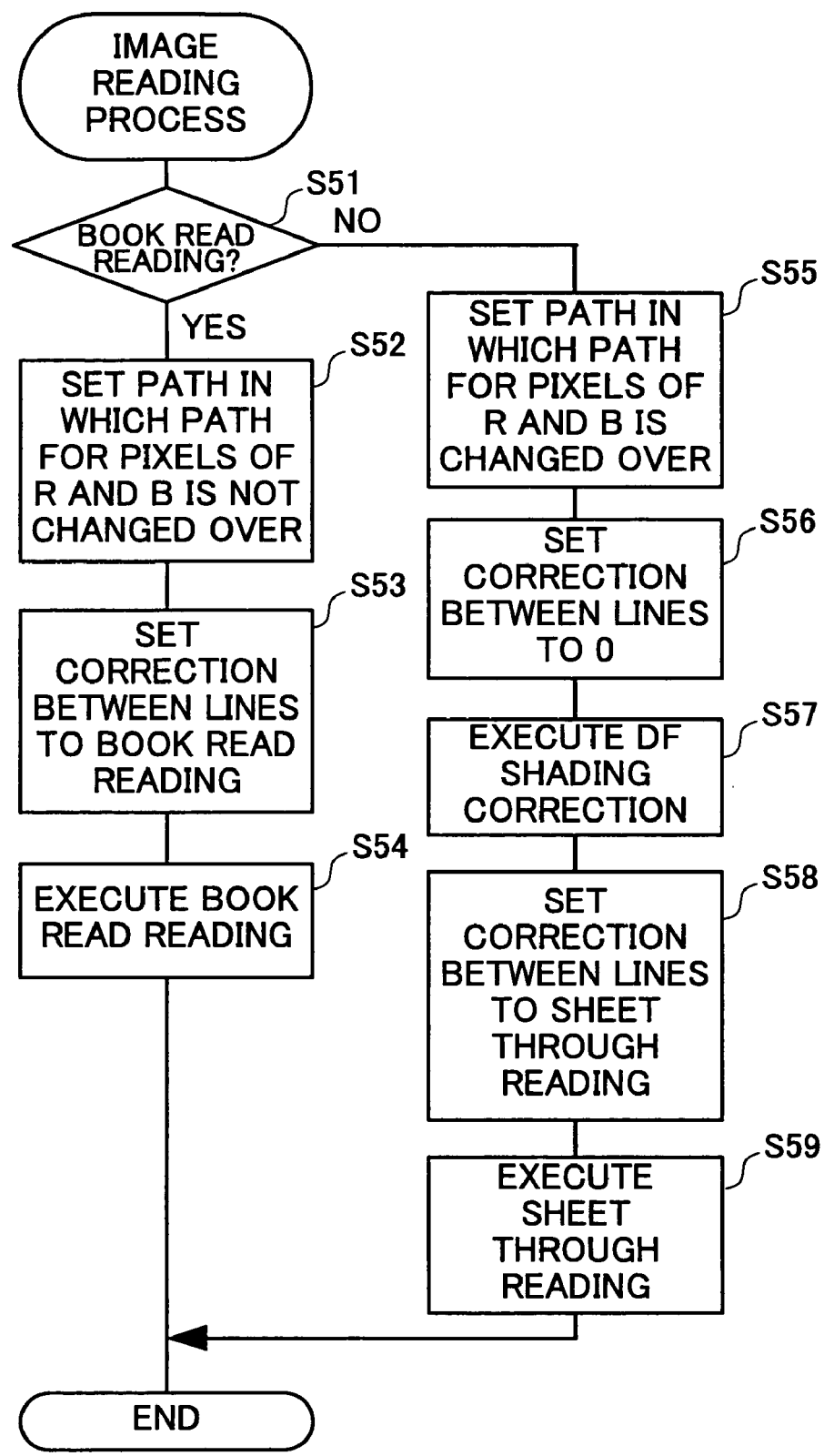
FIG. 13 is a flowchart showing a fourth operation for controlling a setting of correction between lines.

FIG. 13 is a flowchart showing a fourth operation for controlling a setting of correction between lines. First, it is determined whether the image reading apparatus executes book read reading (step S51). When the image reading apparatus executes the book read reading (Yes at step S51), the image reading apparatus executes steps S52 through S54, as in the steps 12 through 14 shown in FIG. 10.

On the other hand, when the image reading apparatus does not execute the book read reading (No at step S51), the image reading apparatus goes to step S55, and set a path in which the path for pixels of R and B is changed over. The image reading apparatus goes to step S56 and sets the correction between lines to 0. Further, the image reading apparatus goes to step S57 and executes the DF shading correction.

Then the image reading apparatus goes to step S58 and sets the correction between lines to the sheet through reading, executes the sheet through reading (step S59), and ends the operation.

According to the flowchart shown in FIG. 13, the image reading apparatus sets a path in which the path for pixels of R and B is changed over, sets the amount of the correction between lines to 0, executes the DF shading correction and sets the amount of the correction between lines matching the reading variable magnification, and executes the sheet through reading. With this, even when the correction data of each hue cannot be set again from the CPU, the effective range of the white reference plate 251 (DF shading correction possible range in FIG. 1(b)) can be widened, compared with the case shown in FIG. 1(a).

Further, the present invention is not limited to the specifically disclosed embodiments, and variations and modifications may be made without departing from the scope of the present invention.

The present invention is based on Japanese Priority Patent Application No. 2004-334563, filed on Nov. 18, 2004, with the Japanese Patent Office, the entire contents of which are hereby incorporated by reference.

What is claimed is:

1. An image reading apparatus, comprising:
    a plurality of sensors that execute photoelectric conversion of a plurality of hues; and
    a correction unit that corrects displacement of image data caused by intervals between the plural sensors and includes a first draft reading mode whose scanning direction by the sensors is the same at the time of scanning a sheet and at the time of shading correction, and a second draft reading mode whose scanning direction by the sensors is different at the time of scanning the sheet and at the time of shading correction, wherein:
    the correction unit comprises a plurality of paths including a different number of delay units disposed in each path, and changing over units that change over a connection between the sensors and the paths;
    the changing over units operate such that the connection between the sensors and the paths are different at the time of reading image data and the shading correction in the first draft reading mode and at the time of reading image data in the second draft reading mode to compensate for different scan directions relative to the plural sensors; and
    the changing over units are disposed in front of and at the back of the plural paths, and when a block executing the shading correction exists between the front changing over unit and the back changing over unit, correction data for the shading correction are set again before reading the image data in the second draft reading mode.

2. The image reading apparatus as claimed in claim 1, wherein:
    when the correction unit is not able to set the correction data for the shading correction again, the correction unit changes over the changing over units in the same as at the time of the reading image data in the second draft reading mode at the time of the shading correction, executes the shading correction by setting a delay amount to 0 by the delay unit and executes the reading image data in the second draft reading mode after setting the delay amount by the delay unit for the second draft reading mode.

3. The image reading apparatus as claimed in claim 1, wherein:
    the first draft reading mode is a book read mode and the second draft reading mode is a sheet through mode.

4. An image reading method in an image reading apparatus including a plurality of sensors that execute photoelectric conversion of a plurality of hues, and a correction unit that corrects displacement of image data caused by intervals among the plural sensors and includes a first draft reading mode whose scanning direction by the sensors is the same at the time of scanning a sheet and at the time of shading correction, and a second draft reading mode whose scanning direction by the sensors is different at the time of scanning the sheet and at the time of shading correction, wherein:
    the correction unit comprises a plurality of paths including a different number of delay units disposed in each path and changing over units that change over a connection between the sensors and the paths, and the correction unit has the changing over units in front of and at the back of the plural paths, wherein the method comprises the steps of:

executing the shading correction using the changing over units at the time of the reading image data in the first draft reading mode;

executing the reading image data in the second draft reading mode with the changing over units providing a different data flow than provided during the shading correction of the second draft reading mode to compensate for different scan directions relative to the plural sensors.

5. The image reading method as claimed in claim 4, wherein:

when the correction unit is not able to set the correction data for the shading correction again, the correction unit changes over the changing over units in the same as at the time of the reading image data in the second draft reading mode at the time of the shading correction, executes the shading correction by setting a delay amount to 0 by the delay unit and executes the reading image data in the second draft reading mode after setting the delay amount by the delay unit for the second draft reading mode.

6. The image reading method as claimed in claim 4, wherein:

the first draft reading mode is a book read mode and the second draft reading mode is a sheet through mode.

7. The image reading apparatus as claimed in claim 1, wherein:

when a block executing the shading correction exists between the front changing over unit and the back changing over unit, correction data for the shading correction are set again before reading the image data in the second draft reading mode.

8. The method of claims 4, further comprising:

setting again correction data for the shading correction when a block executing the shading correction exists between the front changing over unit and the back changing over unit, before reading the image data in the second draft reading mode.

* * * * *